March 31, 1964  G. REISSINGER  3,126,652
ROAD CLEARING APPLIANCE
Filed Feb. 20, 1962
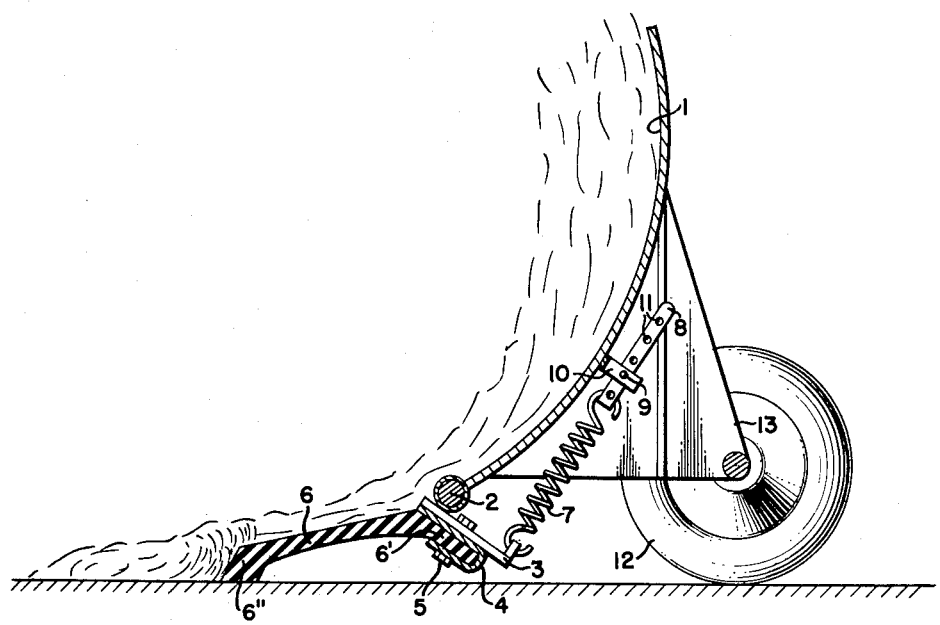
INVENTOR
GOTTFRIED REISSINGER
BY
ATTORNEYS

United States Patent Office 3,126,652
Patented Mar. 31, 1964

3,126,652
ROAD CLEARING APPLIANCE
Gottfried Reissinger, Seeshaupt (Starnberger See),
Bavaria, Germany
Filed Feb. 20, 1962, Ser. No. 174,560
Claims priority, application Germany Feb. 24, 1961
3 Claims. (Cl. 37—41)

The present invention concerns a road clearing appliance, preferably for clearing slush, comprising a snow-plough mold board and a rubber ledge located on the lower edge thereof.

This invention is particularly adapted for use in clearing slush or the like from airfield runways and taxiways, and the resilient rubber ledge which will be pivotally mounted on the lower edge of a mold board or scraper blade is particularly adapted to prevent damage to a surface being cleaned.

Rubber elements previously used on scraper blades were generally subject to extreme wear. This was probably due to the rapid speed of the vehicle upon which they are mounted as well as the fact that a substantial portion of the weight of the heavy mold board rested on these rubber scraper elements.

It is an object of the present invention to overcome these deficiencies of known appliances.

According to the present invention therefore, a road clearing appliance, preferably for clearing slush, has a rubber ledge provided on the lower edge of a mold board, in which appliance the rubber ledge is pivotally journalled along the lower edge of the share and is urged at a forward edge portion in the direction of the ground by means of a rearwardly projecting lever portion and a tension spring supported on the back of the mold board.

The resilience of the rubber ledge determines the supporting pressure of the rubber ledge against the ground and is in consequence, adapted to be kept within controllable limits and optionally adjustable. Tests have confirmed that with driving speeds of 60 kilometers per hour the frictional wear is only a fraction of that of known rubber ledges and permits a constant good clearing effect to be obtained.

A further advantageous feature is also provided in that the rubber ledge may be kept flush with the lower edge of the share and that furthermore a section of an automotive vehicle tire, for example, a vehicle tire can be used as the rubber ledge, one fixing limb extension of which can be adapted to be fixed in a generally U-shaped steel plate reinforcement on the lever arm. Hence it is possible for cheap rubber ledges from used vehicle tires to be employed, the elastomeric property situated in the inner limb curve being caused to assist in the resilient abutment against the ground. The spring itself is conveniently mounted on a bracket on the back of the mold board by means of a mounting strap having a row of holes and studs, so that, in the most simple manner, the spring tension can be adjusted and altered, as becomes necessary with the progressive reduction in width of the rubber ledge due to wear.

The invention will be described further, by way of example with reference to the accompanying drawing in which the single figure is a schematic cross-sectional side elevation of one embodiment.

A mold board 1 is mounted in a tensioned and suitable manner on the front of a mechanically propelled vehicle, preferably in combination with a lifting mechanism for raising and lowering said mold board. It is also mounted on a bogie so as to be pivotable and adjustable in a diagonal position relative to the direction of travel. The lower edge of the mold board has an axle pin 2 provided thereon about which a pivotal arm 3—conveniently one is provided at each of the two share ends—is pivotally journalled. On this pivotal arm 3, there is fixed a generally U-shaped steel plate reinforcement 4 for a fixing limb extension 6' of a profile section 6 of a vehicle tire, which secured to the reinforcement 4 by means of screws 5. The profile section 6 includes a free, upwardly deformable portion immediately forward and below the axis of rotation of said ledge element as defined by said axle pin 2. A spring 7 is mounted by means of a mounting strap 8 and studs 9 in one of the holes 11 on a mounting bracket 10 on the back of the mold board. When the front drag limb strip 6" is placed on the ground surface, the mold board 1 is lowered to such an extent that the main portion of the rubber ledge 6 is situated substantially in continuation of the curvature of the mold board, the pivotal arm 3 being correspondingly pivoted in a downward direction about the axle pin 2, thereby extending the tension spring 7.

If the method of operation and the advantages of the novel clearing appliance are stressed above particularly in connection with slush clearing, its operation is not limited only to this, for it may be used, for example, for scattering chips or grit from the edge of the road into the centre thereof. During this operation several chip particles are run over or rolled over by the rubber ledge, which is desirable since chips or grit should also remain at the edge of the road.

The mold board 1 may have a supporting wheel 12 which is held by means of a supporting bracket 13.

I claim:

1. In a road clearing implement, a mold board having a lower edge, a resilient deformable ledge member of rubber-like material pivotally mounted transversely of said mold board lower edge and extending along said lower mold board edge, said ledge member including a free-upwardly deformable portion extending downwardly and forwardly below the pivot axis of said ledge member and continuing in a portion depending forwardly of said upwardly deformable portion for engaging a surface to be scraped, said ledge member including a portion projecting rearwardly of said pivot axis at the lower edge of said mold board, and tension means secured to said portion of said ledge member projecting rearwardly and said tension means being secured to said mold board and normally pivoting said depending portion of said ledge member about said pivot axis into engagement with a surface to be scraped.

2. The structure of claim 1 in which said tension means includes a lateral mounting bracket projecting rearwardly from said mold board, a mounting strap supported for vertical adjustment in said mounting bracket, a tension spring terminally secured between said mounting strap and said portion of said mold board projecting rearwardly of said pivot axis, said mounting strap including a plurality of longitudinally spaced apertures, and stud means removably received in said longitudinally spaced apertures.

3. In a road clearing implement, a mold board having a lower edge, a resilient edge member pivotally mounted on and extending the width of said board at said lower edge, said resilient edge member projecting forwardly and downwardly from said mold board edge forming a substantially free unsupported continuation of the inner surface of said mold board, lever means projecting rearwardly of the pivotal axis of said edge member, and tension means extending between said lever means and said mold board for normally urging said free continuation below the pivotal axis of said mold board, said free continuation of said mold board comprising a support surface subject to the weight of material being moved for urging it downwardly toward a surface being scraped, said free continuation of said resilient edge member including a depending strip portion for engaging a surface being scraped.

References Cited in the file of this patent

UNITED STATES PATENTS

| | | |
|---|---|---|
| 1,383,409 | Liddell | July 5, 1921 |
| 2,055,291 | Henry | Sept. 22, 1936 |
| 2,061,585 | Meyer | Nov. 24, 1936 |

FOREIGN PATENTS

| | | |
|---|---|---|
| 446,192 | Great Britain | Apr. 27, 1936 |